United States Patent [19]

Novy et al.

[11] Patent Number: 5,145,581
[45] Date of Patent: Sep. 8, 1992

[54] COMPOSTING SYSTEM UTILIZING AIR RECIRCULATION

[75] Inventors: Vladimir A. Novy, San Pedro; Ross C. Caballero, Pacific Palisades, both of Calif.

[73] Assignee: County Sanitation Districts of Los Angeles County, Whittier, Calif.

[21] Appl. No.: 687,548

[22] Filed: Apr. 16, 1991

Related U.S. Application Data

[63] Continuation-in-part of Ser. No. 474,968, Feb. 2, 1990, abandoned.

[51] Int. Cl.$^5$ ............................................. B01J 8/00
[52] U.S. Cl. ....................................... 210/609; 55/89
[58] Field of Search ............... 71/9, 11, 12; 210/609, 210/150; 55/89, 98; 110/347, 348

[56] References Cited

U.S. PATENT DOCUMENTS

| | | | |
|---|---|---|---|
| 3,895,916 | 7/1975 | Rosner | 71/9 X |
| 4,010,098 | 3/1977 | Fassell | 210/609 |
| 4,882,058 | 11/1989 | Burton | 210/150 X |
| 4,956,002 | 9/1990 | Egarian | 71/11 X |
| 5,017,351 | 5/1991 | Rafson | 55/89 X |

FOREIGN PATENT DOCUMENTS 0645333 9/1984 Liechtenstein .................. 71/12

*Primary Examiner*—Frank Spear
*Attorney, Agent, or Firm*—Robbins, Dalgarn, Berliner & Carson

[57] ABSTRACT

An in-vessel composting system wherein the exhaust gas from aerated compost feed material is pretreated by scrubbers and then by a chiller/condenser. A small portion of this cool, relatively dry, ammonia-free gas is passed through an activated carbon column and discharged to the atmosphere. The remaining portion of the exhaust gas is supplemented by ambient air to make-up for the volume of air vented and recirculated through the composting system until such time as the system requires a fresh supply of oxygen. The system is then recharged by blowing in ambient air and venting the spent recirculating air.

15 Claims, 3 Drawing Sheets

COMPOSTING SYSTEM UTILIZING AIR RECIRCULATION

This is a continuation-in-part of co-pending application Ser. No. 07/474,968 filed on Feb. 2, 1990 now abandoned.

This invention relates to composting systems and, in particular, to an in-vessel composter wherein the compost feed material is aerated and the air passing through the compost feed material is treated and then recirculated to be used as aeration air.

BACKGROUND OF THE INVENTION

Aerobic composting of organic residual material such as manure, garbage, sewage sludge, mixed solid waste, leaves, and green wastes, yields a product which is a valuable soil conditioner. The composting process requires a continuous supply of oxygen to the microbial population in the compost feed material to decompose the organic portion of the material into a stable, usable form. Old composting processes utilized open field windrows and aerated static piles to achieve this. To enhance these processes, machines for mixing the windrows, such as the SCARAB TM machine by the Scarab Manufacturing Company, were used. Bulking agents, such as sawdust, were also used by mixing them with the feed material permitting greater air contact with the feed material.

A relatively new development in composting technology is the use of in-vessel composters whereby the composting process takes place in a sealed container. In order to obtain an acceptable product, a forced aeration system must be utilized to push air through the compost feed material. The volume of air used must be carefully regulated in order to supply sufficient amounts of oxygen to the microbial population, to evaporate moisture from the compost mass so as to obtain a final product having approximately 40-45% moisture by weight, and to cool the composting temperature should it exceed about 160° F. (inhibiting bacterial action). In-vessel composting has a number of advantages over windrow composting including, a shorter composting cycle, independence from weather problems and a significant reduction in dust and odor.

Many existing composting installations use a combination of in-vessel composting systems and some of the older prior art techniques. Table 1 describes the composting systems used by major composting facilities in the United States.

A significant problem of composting in general is that the chemical and biological reactions occurring between the compost feed material, the microbial population, and the aeration air create a wide assortment of odorous compounds. Such compounds include ammonia, organic sulfides and aldehydes. In addition, toxic volatile organic compounds are generated by the self-heating biological process which volatilizes these compounds from the feed material. For example, volatile compounds in sewage sludge includes photochemically reactive organic gases such as xylenes, cycloolefins and other aromatics.

In the case of windrows and aerated static piles, the air that has passed through the compost mass is often allowed to dissipate into the atmosphere without treatment. In-vessel composters, however, use forced aeration systems that create significantly greater volumes of air being pushed through the compost mass. This continuous stream of exhaust gas must be treated to remove odorous and toxic compounds below human smell recognition threshold levels or toxic threshold levels before it is discharged into the atmosphere. Various treatment technologies are currently being used to treat the exhaust air, including: scrubbing with water, acids, caustics, and/or bleach; filtration through odor filter piles or other media (carbon); dilution with fresh air; and final discharge and dispersion through elevated stacks. Because the exhaust gas from the composter contains a complex mixture of compounds, more than one treatment method is often employed. Table 2 describes the odor control systems used by major composting facilities in the United States.

Despite the use of various odor control methods, existing in-vessel composting installations have been unable to insure consistent, adequate odor control or to adequately reduce the emission of toxic compounds. In addition, the aeration air is not recirculated into the composter which results in large and expensive exhaust air treatment facilities.

SUMMARY OF THE INVENTION

The present application describes an in-vessel composting system wherein the exhaust gas from the composter is treated and recirculated through the composter. Recirculation of the exhaust gas substantially reduces the total volume of gas ultimately vented out of the system into the atmosphere, thus substantially reducing the size and expense of exhaust air treatment facilities and making them more efficient in the removal of odors and toxic gases.

The basic system comprises an in-vessel composter, including an aeration system for aerating the compost feed material. A blower is used to force the aeration air through the compost mass. The air that has passed through the compost mass will have picked up moisture, and odorous and toxic compounds. This exhaust gas is then treated, by scrubbers for example, to remove as many undesirable compounds as possible. A small portion of the exhaust gas is then vented and the remaining portion is recirculated into the compost mass as aeration air. Just prior to recirculation, however, the exhaust gas is replenished with an amount of ambient (make-up) air sufficient to compensate for the amount of exhaust gas vented. The make-up air provides a fresh supply of oxygen necessary for the composting process. Finally, because the oxygen level in the recirculating gas will diminish to a level wherein the make-up air can no longer supplement it to provide sufficient oxygen to the compost mass, the "spent" recirculating air must be periodically vented. At this point, the aeration system is shut down, ambient air is blown through the exhaust air lines, and the recirculation air is vented through the air treatment facilities to the atmosphere, thus recharging the system with a fresh supply of oxygen.

An advantageous addition to the system is the use of a chiller/condenser which cools the exhaust gas and condenses moisture and some heavy molecular organic compounds as well. The chiller/condenser is further used to adjust the temperature and relative humidity of the exhaust gas to resemble that of ambient air prior to recirculating the exhaust gas through the compost mass.

In addition to the advantage of reducing overall volume of exhaust gases, recirculation also allows the efficient use of activated carbon columns which adsorb volatile organic compounds and odorous sulfur compounds from the exhaust gas before the gas is vented to the atmosphere. Because of the limited adsorption capacity of carbon, it was previously too expensive and inefficient to use carbon columns with prior in-vessel composting methods that emitted significantly greater volumes of hot, moist air.

It has been found that use of the features described above has produced a final compost product that is a valuable soil conditioner, virtually odorless and pathogen free. The present invention also insures a high degree of odor and toxic compound removal from the exhaust gas while providing low operation and maintenance costs and reliable composting of organic residue materials.

DETAILED DESCRIPTION

While the invention will be exemplified by reference to a composting system using sewage sludge as the compost feed material, the invention in general and certain aspects in particular, are broad in scope, for example, the concept of recirculating the exhaust gas through the compost feed material. Consequently, specific details disclosed herein are merely representative and are deemed to afford the best embodiments known at this time to provide a basis for the claims which define the scope of the present invention. It is further understood that the invention is useful with any type of compost material or with any type of air treatment method for removing undesirable compounds from the exhaust gas in composting systems.

Figure 1:
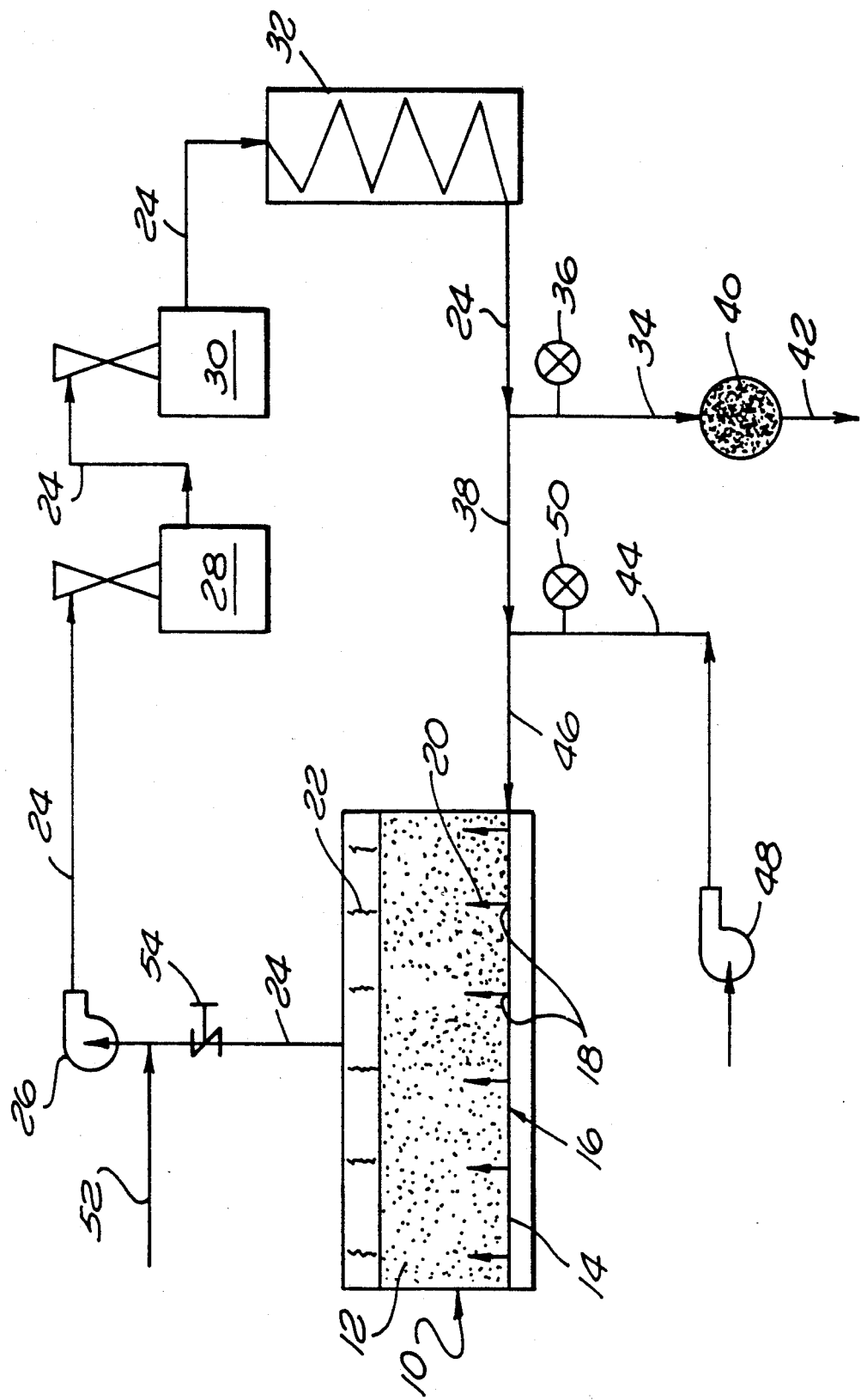
FIG. 1 is a schematic of a preferred embodiment of the invention.

Referring to FIG. 1, an in-vessel composter 10 containing compost mass or feed material 12 is shown in schematic form. A variety of in-vessel composters are available on the marketplace. Ashbrook-Simon-Hartley manufactures a tunnel-type composter wherein the compost feed material (in the present case, sewage sludge), is introduced into one side of the composter on a daily basis and is progressively pushed through to the other side of the composter over a specified period of time. The material is then discharged into a receiving bin (not shown). Another type of vessel, known as a vertical composter, introduces the material through the top of the vessel and progressively pushes the material downward over a specified period of time before discharging it at the bottom. Such a vessel may also include mixing apparatus for mixing horizontal layers of the feed material to achieve a more uniform and fully composted end product. Such a system is manufactured by the Compost System Company.

The time spent in the composter normally corresponds with the composting cycle, that is, the time necessary to achieve a suitable final compost material. The composting cycle is contingent upon many factors, including the "recipe" of the feed material, aeration rates, and temperature. Methods for optimizing the composting cycle are well known, see, for example, Haug, R.T., *Design and Operating Criteria for Composting*; Haug, R.T., *Compost Engineering Principals and Practice*, Ann Arbor Science Publishers, Inc. (currently available from Technomics Pub. Co.) (1980); Haug, R.T., Composting Process Design Criteria, Parts 1-4, *Bicycle, Journal of Waste Recycling*, Vol. 27, Nos. 7-10 (Aug. -Dec. 1986); Murray, C.M. and Thompson, J.L., Strategies for Aerated Pile Systems, *Biocycle, Journal of Waste Recycling*, Vol. 27, No. 6 (July 1986).

As shown in FIG. 1, composter 10 contains an aeration system 14 for distributing air throughout the compost feed material 12. The system is comprised preferably of plastic, corrosion-resistant, reinforced piping 16. The piping 16 is perforated 18 to allow the flow of aeration air 20 into the compost feed material 12. There are a number of aeration systems available on the market. For example, American BioTech offers an Air Lances TM system that introduces the air through vertical perforated pipes (lances) inserted into the compost mass from the top. Other ways that improve aeration characteristics include the occasional mixing of the compost feed material and the introduction of bulking agents, such as sawdust, into the feed material which both more readily allow aeration air to come into contact with the organic particles of the compost mass.

The aeration air that has been pushed through the compost feed material (exhaust gas 22) is delivered away from the composter 10 to air treatment devices by means of an exhaust air line 24. An exhaust air blower 26 may be used to suck the exhaust gas 22 from the composter 10 and force it towards the air treatment devices.

Air treatment would preferably include a water scrubber 28, such as a high energy venturi scrubber which utilizes an atomized stream of water at approximately 80 psig to intercept the hot, moisture laden air exhausted from the in-vessel composter. Such a scrubber removes dust particles as small as 0.5 microns from the exhaust gas, and also cools the exhaust gas, reduces the moisture in the gas, and removes a substantial portion of any ammonia in the gas.

Next, an acid scrubber 30, such as a low energy venturi scrubber, would preferably be included in the exhaust air line 24. The low energy venturi scrubber utilizes an atomized stream of sulfuric acid of pH=4.0-4.5 at 20 psig to intercept the exhaust gas and remove all remaining ammonia. Through the use of water and acid scrubbers, the component of the exhaust gas having a significant impact on odor emissions, ammonia, is completely removed.

After being treated by scrubbers, the exhaust gas line 24 would preferably deliver the exhaust gas to a chiller/condenser 32. By chilling the gas, its temperature is further reduced casing condensation of additional moisture and also condensing some heavy molecular organic compounds, such as terpenes and hydrocarbons.

The exhaust air line 24 leaving the chiller/condenser 32 is split into a recirculation air line 38 and a vent line 34 having a flow meter 36. At this point, the exhaust gas has undergone treatment resulting in a cooler, drier, ammonia-free gas. Significant additional odor and toxic gas reduction benefits are achieved by placing an activated carbon column 40 after the flow meter 36 in the vent line 34. A small portion of the exhaust gas is then diverted to vent line 34 and passed through the bed of activated carbon in the carbon column 40 where odorous and toxic organic gases (sulphur compounds such as mercaptans, methyl and dimethyl sulfides, terpenes and aromatic compounds) are adsorbed prior to discharging the gas through a stack 42. Thermally regenerated coal base carbon may be used as well as other porous inert materials, such as zeolites or alumina, that adsorb sulphur and/or volatile organic compounds. Because of the relatively small amount of exhaust vented and due to the treatment the gas has already received, activated carbon columns can now be economically used in air treatment facilities.

Just prior to reintroducing the remaining portion of exhaust gas into the in-vessel composter 10, it is combined with ambient air to make-up for the exhaust gas which was vented. A make-up air line 44 is combined with the recirculation air line 38 to form an aeration air feed line 46 which is then connected to the aeration system 14 through a wall of the composter 10. The make-up air is pumped into the make-up air line 44 by means of a make-up air blower 48. The air pressure supplied by the blower 48 should be sufficient to supply the required make-up air volume. A flow meter 50 can be placed in the make-up air line 44 to control this. Preferably, ambient air is used as the make-up air, however, any suitable air composition can be introduced into the system, for example, oxygen enriched air may be supplied to enhance the composting process.

A final necessary component to the present invention is a recharging air line 52 which is connected to the system, preferably just above the in-vessel composter 10. The recharging air line 52 is used to periodically supply the system with fresh air. Ambient air may be used as the source. During this recharging mode, the make-up air blower 48 is shut down, an exhaust air valve 54 is closed, the recharging air line 52 is opened and the existing exhaust air in the system is pushed by the recharging air through the exhaust air line 24 by the blower 26, through the scrubbers 28 and 30, the chiller/condenser 32, to the vent line 34, through the activated carbon column 40 and discharged into the atmosphere through the stack 42. At this point, the recirculation mode is restarted by closing the recharging air line 52, opening the exhaust air valve 54, and turning on the make-up air blower 48.

The reason for closing the exhaust air valve 54 is to prevent the new charge of fresh air from recirculating through the in-vessel composter 10 prior to restarting the recirculation mode and to speed up the process of venting the "spent" exhaust air. It will be appreciated that the exhaust air valve 54 can be placed between the composter 10 and recharging air line 52 or it can be placed in the recirculation air line 38 or the aeration air feed line 46.

Figure 3:
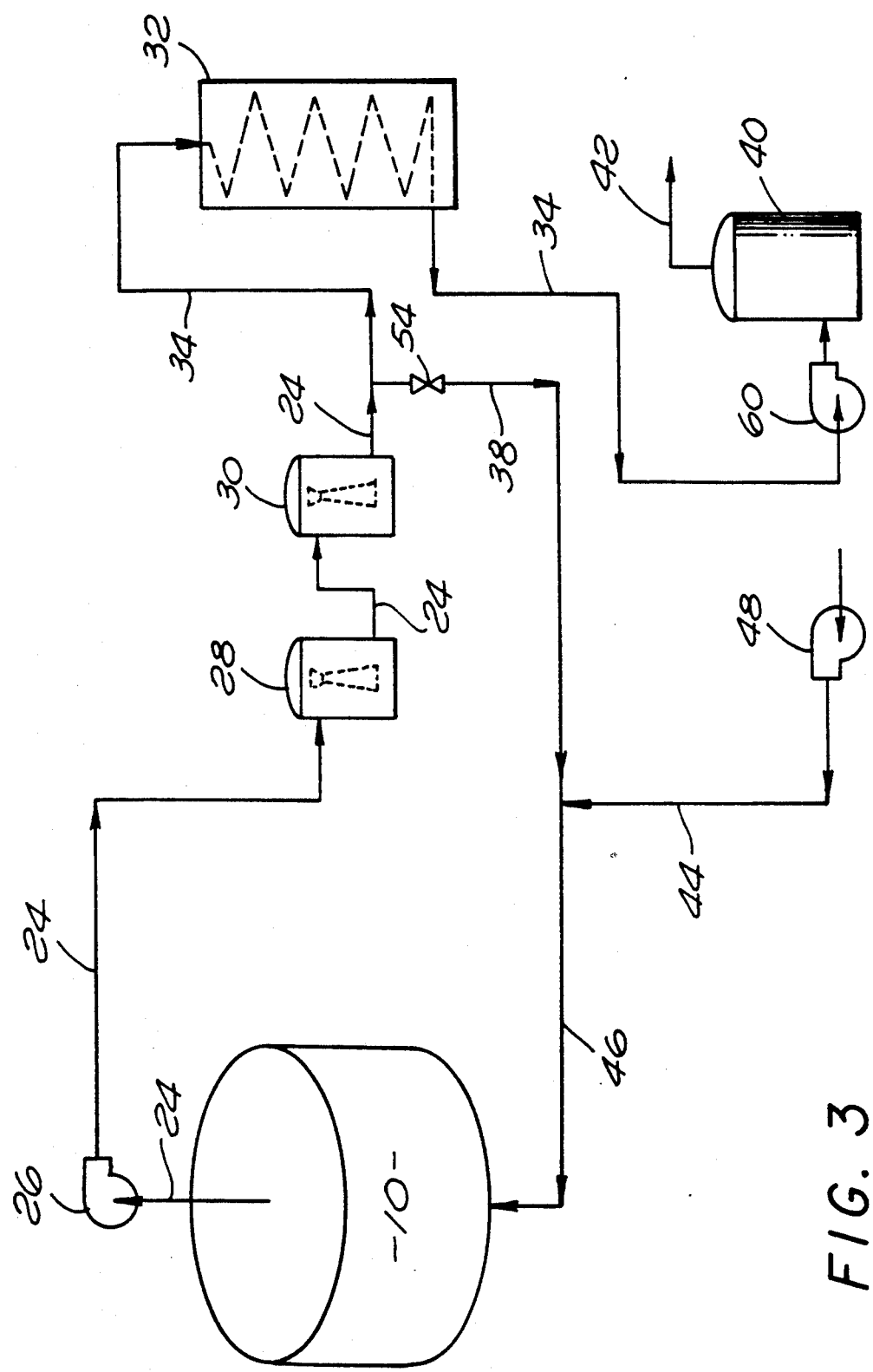
FIG. 3 is a schematic of a second preferred embodiment of the invention.

FIG. 3 illustrates a second preferred embodiment of a compositing system utilizing air recirculation. In this embodiment, the fresh air supplied during the recharging mode is permitted to pass through the feed material in the in-vessel composter 10 while purging of the spent exhaust air is occurring. As in the system of FIG. 1, no substantial amount of exhaust air is permitted to recirculate during the recharging mode.

In FIG. 3, the exhaust air valve 54 is placed in the recirculation air line 38, i.e., between the vent line 34 and the make-up air line 44. With the exhaust air valve in this location, the recharging air line 52 (shown in FIG. 1) is no longer required. Recharging is accomplished by simply closing the exhaust air valve 54 and continuing to allow make-up air from make-up air line 44 to flow through the aeration system. Exhaust air blower 26 and/or make-up air blower 48 may be adjusted, if necessary, to purge the exhaust air. In this manner, ambient air is introduced into the aeration air feed line 46 and into the composter interstitial void volumes on the "heel" of the "spent" air being scrubbed and removed via the vent line 34. A vent line blower 60 may be used to assist the process. The recirculation mode is restarted by opening the exhaust air valve 54.

Another alterative depicted in FIG. 3 is the placement of the chiller/condenser 32 in the vent line 34 before the carbon column 40, instead of in the exhaust air line 24 as shown in FIG. 1. This may be done to avoid excessive drying of the compost feed material which could inhibit bacterial action. Also, because lower volumes of air are passed through the vent line, a smaller unit may be used. It has been found that reducing the moisture in the vented exhaust gas dramatically increases the adsorption capacity of the carbon column by as much as six-fold.

The advantages of the above described composting system are best illustrated by an example. Applicants have theoretically determined the aeration requirements for sewage sludge from the wastewater treatment plant in Los Angeles County. For proper composting per dry ton of sewage sludge per day (in a compost mix of 40% by volume of sludge and 60% by volume of sawdust), 67 standard cubic feet per minute (scfm) of ambient air (60° F., 60% relative humidity) is required for proper microbial activity, 175 scfm of ambient air is needed for sufficient water evaporation, and 720 scfm of ambient air is needed for proper cooling of the compost mass, totaling 960 scfm per dry ton per day. Based on a 14 day composting cycle, it has been determined that a suitable final compost product will be obtained having approximately 40-45% water content by weight.

To start the aeration process, the make-up air blower 48 and the exhaust air blower 26 are turned on to begin circulating air through the system. The blower 26 is set to achieve 960 scfm per dry ton per day. As the air passes through the compost mass 12 in the composter 10, it is heated due to microbial activity and it also absorbs moisture, ammonia, sulphur and other volatile organic compounds as well as carbon dioxide which is produced by the microbial population.

Upon leaving the composter, it is expected that the exhaust gas 22 will have been heated to approximately 130° F. and have 100% relative humidity (RH). Heating to 130° F. for at least five days is known to destroy pathogens such as salmonella in sewage sludge.

At this time the exhaust gas is sent through the water scrubber 28 to remove dust, ammonia and moisture. The scrubber 28 is supplied by secondary effluent (having a pH of 6.5) from the plant at 60-70° F. The temperature of the exhaust gas leaving the water scrubber 28 will be approximately 80-90° F. and moisture will be reduced in the exhaust gas from about 15% to 3-4% by volume. Ammonia scrubbing occurs with about 95% efficiency. The acid scrubber 30 is then used, if necessary to remove any remaining ammonia. The necessary flow of effluent through the water scrubber and sulfuric acid through the acid scrubber to remove the ammonia can be readily determined during the start-up phase of the system.

After scrubbing, the exhaust gas is passed through the chiller/condenser 32 where the temperature of the air is reduced from about 80-90° F. to about 40-50° F. and the moisture is reduced to about 1% by volume. The exhaust gas at this point is at about 60% relative humidity and is completely ammonia free (resembling ambient air) which is needed in order to recirculate the exhaust gas through the compost mass where it will absorb additional moisture and ammonia generated by the bacterial decomposition of the organic matter. Alternatively, if warmer, moister air is desired, exhaust air may be recirculated directly from the scrubbers as shown in FIG. 3.

Before recirculation, a portion of the exhaust gas is vented. In the example, 7% (67 scfm) of the total circulating air volume is vented through the activated carbon column and the remaining 93% (893 scfm) is first blended with 7% (67 scfm) make-up air to compensate for the amount vented and then recirculated through he system. Applicants arbitrarily chose 67 scfm as the volume of make-up air to add to the system. This corresponds to the amount of ambient air necessary to provide approximately twice the oxygen requirements for proper microbial activity. For the sewage sludge compost mass in this example, it was determined that the $O_2$ bacterial uptake is approximately 0.57 lb./min. which is equal to 7.0 scfm $O_2$ per dry ton per day capacity. 7.0 of ambient air (which contains 20.9% $O_2$ by volume).

As the 93% of total circulation air volume (ie., the recirculation air) moves from the chiller/condenser 32 to the aeration air feed line 46, it is warmed up to ambient temperature. After blending with 7% ambient air (which partially replaces the oxygen consumed by the microbial population in the composter) this combined 7% make-up/93% recirculation air (not at 60° F. and 60% RH) is recirculated into the in-vessel composter 10 through the aeration piping 16 under slight pressure (1-2 psig).

This recirculation mode continues until certain critical parameters are met, namely, until the oxygen level in the combined make-up/recirculation air falls below the level needed to insure proper microbial activity or the carbon dioxide level in that air raises above a level which would inhibit proper microbial activity. It is noted that the stoichiometric equation for microbial activity in sewage sludge is $C_6H_{12}O_6 + 6O_2 \rightarrow 6CO_2 + 6H_2O$ where $C_6H_{12}O_6$ is the idealized organic representation of sludge as glucose. In the sewage sludge compost mass of this example, the $CO_2$ production uptake is approximately 1.13 lb./min. which is 7.0 scfm $CO_2$ per dry ton per day capacity.

Figure 2:
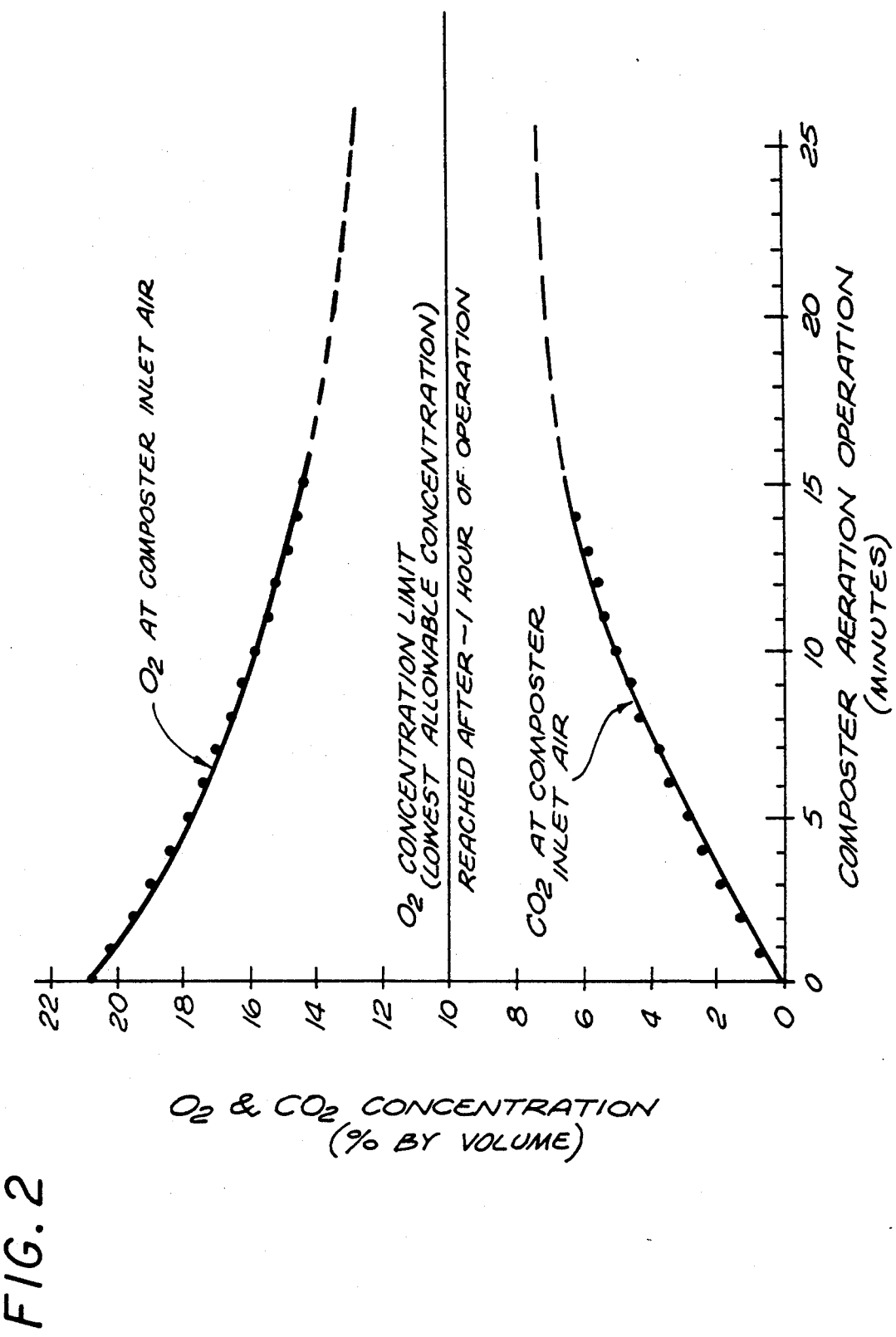
FIG. 2 is a graph of $O_2$ and $CO_2$ levels in the recirculating air being fed to the composter as a function of time during the recirculation mode of the invention.

Since the make-up ambient air does not supply all the $O_2$ which would have been supplied without recirculation, and the venting of air through the activated carbon does not remove all of the bacterially produced $CO_2$, there will be decreased $O_2$ and increased $CO_2$ concentration with time. A theoretical graphical representation of this is shown in FIG. 2. An $O_2$ concentration of 10% by volume has been selected as the lowest allowable $O_2$ concentration in the make-up/recirculation air (although satisfactory aerobic composting is achievable when the interstitial air in the compost feed material has concentrations of oxygen as low as 2% by volume). Based on the 7%/93% ratio of make-up air to recirculation air, the 10% $O_2$ concentration level is reached after about one hour of continuous composter aeration. The corresponding $CO_2$ concentration reached in one hour would be about 9% by volume which is not yet toxic to the bacterial activity, but may be slightly inhibitory. It is noted that the make-up air/recirculation air ratio can be changed to any suitable value. Any change will primarily effect the timing of the recharging mode. For example, a 5%/95% ratio would require the system to be recharged more often than a 7%/93% ratio due to less oxygen being supplied by the make-up air. Additionally, the ratio may be optimized to reduce energy consumption necessary to run the system or to meet local air emission standards.

In the present example, the 7%/93% ratio requires a one hour cycle for recharging. In other words, after about one hour, the recirculation air $O_2$ and $CO_2$ concentrations must be returned to the starting condition (i.e., 20.9% $O_2$ and 0% $CO_2$ by volume). This is achieved by shutting down the make-up air blower 48, closing the exhaust air valve 54, and opening the recharging air line 52 allowing ambient air to be introduced into the exhaust air line 24 on the "heel" of the "spent" exhaust gas being scrubbed and removed via the activated carbon column 40 (see FIG. 1). This recharging mode would last only several minutes depending on the total air volume to be replaced and the flow rate of air being passed through the activated carbon. The recirculation mode would then resume for another hour. This type of operation allows the activated carbon column to remain sized for the small air volume vented during steady state operation.

A pilot scale demonstration unit (compost volume of 250 cubic feet, aeration flow rate of up to 30 scfm) was used to demonstrate the feasibility of the above described process. A compost mass of 40% by volume of sewage sludge and 60% of sawdust was initially aerated by ambient air (one pass through the compost mass only) for 15 days in order to bring the internal compost mass $O_2$ concentration to about 15% by volume which approximates the lower end of steady state composting. The aeration air was then scrubbed and recirculated into the composter for an additional 14 days. The air make-up and activated carbon adsorption were not used in this demonstration because of air leakage into the composter through loose seal of the composter roof (approximating the air make-up) and air leakage out of the composter through unsealed opening along the bottom of the composter (approximating the carbon column venting). Efficiency of the activated carbon had previously been successfully demonstrated, however, using the identical composter/scrubbing system. Demonstration of this invention was successful because normal composting objectives were maintained: (1) composting temperatures ranged from 80-156° F. and were sustained over long periods of time in excess of 131° F., insuring pathogen destruction and optimum functioning of the microbial population; (2) oxygen supply remained adequate, assuring optimum bacterial action and aerobic conditions; (3) moisture removal was confirmed by measuring moisture content of the exhaust gas leaving the composter and of the exhaust gas coming out of the chiller/condenser; and (4) ammonia removal was also confirmed across the scrubbers, resulting in 100% removal.

TABLE 1

| MAJOR IN-VESSEL COMPOSTING PLANTS | | | |
|---|---|---|---|
| Location | Compost System Supplier | Design Capacity[1] | Plant Configuration[2] |
| Akron, OH | Compost Systems Co. (Paygro process) | 73 | R ——— UP |
| Cape May County, NJ | Purac Engineering | 20 | R – AP – UP |
| Clayton County, GA | Taulman Composting Systems | 2.9 | R — R – UP |
| Newberg, OR | Ashbrook-Simon-Hartley | 3.5 | R – AP – UP |
| Plattsburgh, NY | Compost Systems Co. (Fairfield Process) | 34 | R ——— UP |
| Portland, OR | Taulman Composting Systems | 60 | R — R – UP |
| Sarasota, Fl | Purac Engineering | 6.3 | R — R – UP |
| Schenectady, | Amercian BioTech | 15 | R — R – UP |

TABLE 1-continued
MAJOR IN-VESSEL COMPOSTING PLANTS

| Location | Compost System Supplier | Design Capacity[1] | Plant Configuration[2] |
|---|---|---|---|
| NY | | | |

[1] Dry tons per day (dtpd) of sludge
[2] R = in-vessel compost reactor
AP = aerated compost pile
UP = unaerated compost pile (storage)
R --- R = in-vessel compost reactors in parallel

TABLE 2
ODOR CONTROL FACILITIES

| Location | Odor Control System[1] | Air Dispersal System |
|---|---|---|
| Akron, OH | Dilution of process air;[2] Compost filter for dewatering and mixing rooms | Roof fans on building; Ground-level release |
| Cape May County, NJ[3] | Two-stage chemical scrubber for process air; | 100-ft stack |
| | One-stage chemical scrubber for mixing building; | 50-ft stack |
| | One-stage chemical scrubber for sludge storage building | 20-ft stack |
| Clayton County, GA | Bubble air through water in WWTP storage pond | Ground-level release |
| Newberg, OR | Bubble air through water in oxidation ditch | Ground-level release |
| Plattsburgh, NY | One-stage chemical scrubber[2] | 5-ft stack on top of scrubber building (35 ft above ground) |
| Portland, OR[4] | Bubble air through water in primary effluent channel | Ground-level release |
| Sarasota, FL | Ozone contact tower[5] | Stack on top of ozone contact tower (80 ft above ground) |
| Schenectady, NY | One-stage chemical scrubber[2] | Release from top of scrubber (10 ft high) |

[1] For reactor exhaust (process air, unless otherwise specified.
[2] Multi-stage wet scrubber system planned for future installation.
[3] After 1987 modifications.
[4] Plant processes anaerobically digested sludge.
[5] Replaced by two-stage wet scrubber in 1989.

We claim:

1. A method for reducing exhaust gas emissions into the atmosphere from compost feed material having a first oxygen level in an in-vessel composter, comprising the steps of:
   aerating the feed material;
   removing moisture and ammonia from the exhaust gas that has passed through the feed material;
   venting a first portion of the gas that has passed through the feed material after moisture and ammonia have been removed from it;
   recirculating a second portion of the gas that has passed through the feed material after moisture and ammonia have been removed from it and using said second portion of gas to aerate the feed material;
   supplementing the second portion of gas used to aerate the feed material with make-up air containing oxygen in amounts insufficient to sustain the first oxygen level in the compost feed material;
   periodically stopping recirculation when the oxygen level in the feed material decreased to a predetermined level, venting a third portion of the second portion of gas that has been recirculated and replacing this vented third portion with recharging air containing oxygen in amounts sufficient to increase the oxygen level in the feed material above the predetermined level; and
   treating the first portion of gas and the third portion of gas by passing them through an inert porous material that removes volatile organic compounds.

2. The method of claim 1 whereby the make-up air is added to the second portion of the gas prior to entering the in-vessel composter.

3. The method of claim 1 whereby the make-up air is added to the second portion of gas inside the invessel composter.

4. The method of claim 1 whereby the step of stopping recirculation is initiated before the oxygen level throughout the compost mass decreases to about 10% by volume.

5. The method of claim 1 whereby the step of stopping recirculation is initiated before the carbon dioxide level throughout the compost mass increases of about 9% by volume.

6. The method of claim 1 whereby the step of stopping recirculation is initiated before the carbon dioxide level throughout the compost mass is toxic to bacterial activity.

7. The method of claim 1 whereby the inert porous material is activated carbon.

8. The method of claim 7 whereby treatment further includes passing the first portion and third portion of gas through a chiller/condenser before passing them through the activated carbon.

9. The method of claim 1 whereby the inert porous material is zeolite or alumina.

10. The method of claim 1 whereby the direction of flow of aeration is from the bottom to the top of the in-vessel composter.

11. A method for reducing exhaust gas emissions into the atmosphere from compost feed material having a first oxygen level in an in-vessel composter, comprising the steps of:
   aerating the feed material;
   treating the exhaust gas that has passed through the feed material by passing said exhaust gas through water scrubbing means for removing moisture and ammonia from said exhaust gas and subsequently passing said exhaust gas through an acid scrubbing means for removing additional ammonia from said exhaust gas;
   splitting said exhaust gas after it has been treated by the water and acid scrubbing means into a first portion of gas to be vented and a second portion of gas to be recirculation;
   further treating the first portion of gas by venting it through an activated carbon column;
   recirculating the second portion of gas by combining it with make-up air and using said combined gas and air to aerate the feed material, said make-up air being added to the second portion of gas in amounts insufficient to sustain the first oxygen level in the feed material;
   recharging the feed material with oxygen by stopping the recirculation step when the oxygen level in the feed material decreases to a predetermined level, venting the exhaust gas that has passed through the feed material and replacing this vented exhaust gas with air in amounts sufficient to increase the oxygen level in the feed material above the predetermined level; and
   alternatively repeating the steps of recirculating and recharging.

12. The method of claim 11 further comprising the step of passing the first portion of gas through a chiller/condenser prior to treatment by the activated carbon column.

13. The method of claim 11 further comprising the step of passing the first portion of gas through a chiller/condenser after splitting of the exhaust gas and before treatment by the activated carbon column.

14. The method of claim 11 whereby the step of recharging the feed material with oxygen is initiated before the oxygen level throughout the feed material decreases to about 2% by volume.

15. A method for reducing exhaust gas emissions into the atmosphere from compost feed material having a first oxygen level in an in-vessel composter, comprising the steps of:
   aerating the feed material;
   removing moisture and ammonia from the exhaust gas that has passed through the feed material;
   splitting the exhaust gas after moisture and ammonia have been removed into a vent line and a recirculation line;
   treating the exhaust gas in the vent line by passing it through a chiller/condenser and then through an activated carbon column;
   combining the exhaust gas in the recirculation line with fresh air and using said combined gas and air to aerate the feed material, said fresh air being combined with the recirculating exhaust gas in amounts insufficient to sustain the first oxygen level in the feed material until the oxygen level in the feed material drops to a predetermined oxygen level that is lower than said first oxygen level;
   increasing the oxygen level in the feed material above said predetermined oxygen level by substantially reducing the percentage of recirculating exhaust gas used to aerate the feed material until a predetermined recharged oxygen level is reached; and
   alternatively repeating the combining and increasing steps above so that the oxygen level in the feed material varies between the lower predetermined level and the higher recharged level.

* * * * *

UNITED STATES PATENT AND TRADEMARK OFFICE
CERTIFICATE OF CORRECTION

PATENT NO. : 5,145,581
DATED : September 8, 1992
INVENTOR(S) : Vladimir A. Novy, et al.

It is certified that error appears in the above-identified patent and that said Letters Patent is hereby corrected as shown below:

Column 3, line 66, after "Engineering" insert -- - --.
Column 4, line 2, delete "Bicycle" and insert --Biocycle--.
Column 5, line 2, after "exhaust", insert --gas--.
Column 6, line 4, delete "alterative" and insert --alternative--.

Column 7, line 9, delete "he" and insert --the--.
Column 7, line 17, after "7.0" insert --scfm $O_2$ corresponds to approximately 32 scfm--.
Column 7, line 25, delete "not" and insert --now--.
Column 9, line 62, delete "decreased" and insert --decreases--.
Column 10, line 8, delete "invessel" and insert --in-vessel--.
Column 10, line 16, delete "of" and insert --to--.
Column 10, line 48, delete "recirculation" and insert --recirculated--.

Signed and Sealed this

Twenty-eighth Day of December, 1993

Attest:

BRUCE LEHMAN

Attesting Officer

Commissioner of Patents and Trademarks